United States Patent [19]
Wiltzer et al.

[11] Patent Number: 6,107,449
[45] Date of Patent: Aug. 22, 2000

[54] PROCESS AND DEVICE FOR CONTINUOUS PRODUCTION OF POLYAMIDES

[75] Inventors: Karlheinz Wiltzer; Mattias Schuster; Baldur Ebert, all of Bad Blankenburg, Germany

[73] Assignee: Polymer Engineering GmbH, Germany

[21] Appl. No.: 09/194,329

[22] PCT Filed: Dec. 10, 1996

[86] PCT No.: PCT/EP96/05513

§ 371 Date: Nov. 24, 1998

§ 102(e) Date: Nov. 24, 1998

[87] PCT Pub. No.: WO97/45472

PCT Pub. Date: Dec. 4, 1997

[30] Foreign Application Priority Data

May 24, 1996 [DE] Germany ............ 196 21 088

[51] Int. Cl.[7] ............ C08G 69/04; C08G 69/28; C08G 69/36
[52] U.S. Cl. ............ 528/310; 528/312; 528/322; 528/323; 528/332; 528/335; 528/336; 528/499; 528/500
[58] Field of Search ............ 528/310, 312, 528/323, 322, 332, 335, 336, 499, 500

[56] References Cited

U.S. PATENT DOCUMENTS

| | | | |
|---|---|---|---|
| 2,361,717 | 10/1944 | Taylor | 528/310 |
| 5,646,191 | 7/1997 | Wiltzer et al. | 528/499 |
| 5,723,569 | 3/1998 | Sato et al. | 528/310 |
| 5,739,262 | 4/1998 | Morhenn et al. | 528/310 |
| 5,777,067 | 7/1998 | Sato et al. | 528/310 |
| 5,902,553 | 5/1999 | Wiltzer et al. | 528/500 |

FOREIGN PATENT DOCUMENTS

| | | |
|---|---|---|
| 0393548 | 10/1990 | European Pat. Off. . |
| 2417003 | 11/1975 | Germany . |
| 60-217238 | 10/1985 | Japan . |

*Primary Examiner*—P. Hampton-Hightower
*Attorney, Agent, or Firm*—Ostrolenk, Faber, Gerb & Soffen, LLP

[57] ABSTRACT

A process and a device for continuous production of polyamides from a monomer starting material consisting (up to 100%) of adipic acid hexamethylene diamine and water are described. The process is characterized by completing of the first step under pressure at temperatures between 180 and 280° C. in a closed reactor, after which the polyamide is subjected to further steps at the start of each of which vaporized water is removed or driven out by an inert gas.

6 Claims, 1 Drawing Sheet

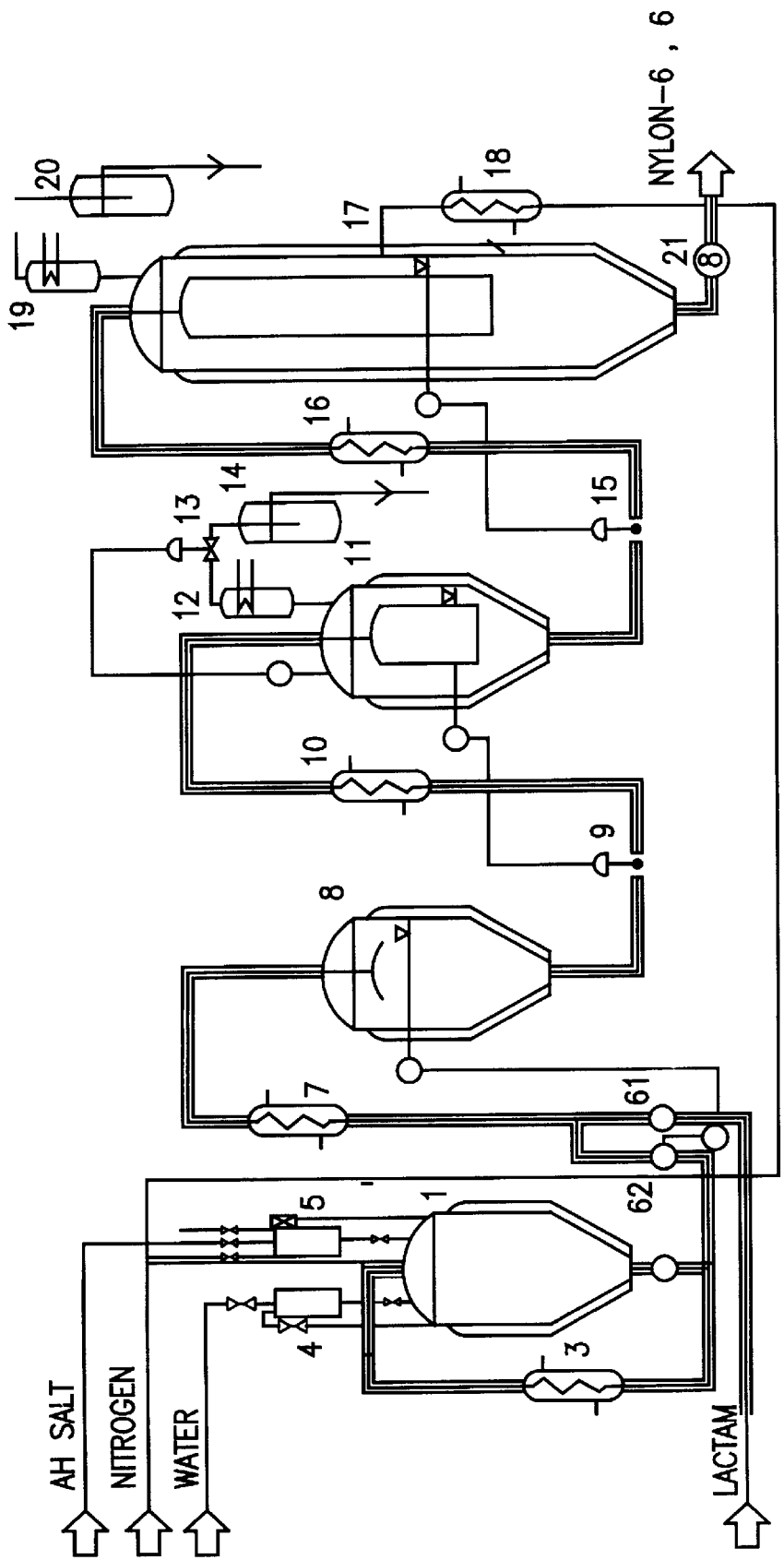

PROCESS AND DEVICE FOR CONTINUOUS PRODUCTION OF POLYAMIDES

BACKGROUND OF THE INVENTION

The invention relates to a process and an apparatus for carrying out the process for continuous preparation of polyamides, the monomeric starting material for which is composed of up to 100% of adipic acid/hexamethylenediamine salt and water.

For polymerizing adipic acid/hexamethylenediamine salt (AH salt) or adipic acid and hexamethylenediamine, it is known that an aqueous AH salt solution can be used as starting material and be heated in a pressurized reactor to a temperature in the range of 220 to 280° C. in order to prepare an AH precondensate in which the $NH_2$ groups of the hexamethylenediamine have reacted with the COOH groups of the adipic acid.

It is known that the aqueous adipic/hexamethylenediamine solution is heated under a pressure which is lower than the vapor pressure of the solution, with simultaneous evaporation of the water, and that the most volatile material driven off, hexamethylenediamine, is collected in a column and reintroduced to the polymerization process (U.S. Pat. No. 2,689,839; U.S. Pat. No. 3,960,820). When the pressure acting on a precondensate of this type is released, small amounts of hexamethylenediamine can escape. To compensate for the excess of acid, which reduces viscosity, an excess of hexamethylenediamine is added (U.S. Pat. No. 3,193,535; DE 2,417,003). Using known processes, water is removed from the polyamide melt, and the melt is post-condensed.

DESCRIPTION OF THE INVENTION

The object of the invention is to use the closed-system method of operating the polymerization reactor under the full pressure which becomes established at the appropriate reaction temperature to achieve complete reaction of the $NH_2$ groups of the hexamethylenediamine and the COOH groups of the adipic acid.

The first step of the novel process is carried out under pressure at temperatures of from 180 to 280 degrees Celsius and then after this the polyamide is fed to further steps at the start of each of which the water which has evaporated is removed or driven out by an inert gas.

According to the invention, for continuous preparation of polyamides the process is conducted in such a way that nylon-6,6 and a copolyamide of the nylon-6/nylon-6,6 type can be prepared in the treatment steps described.

A polymerization reactor of the type described is used to carry out the following steps:

a) preheating the starting materials, b) polymerizing the starting materials in a pressure step with no driving-off of water to give a prepolymer and/or precondensate, preferably at a temperature of from 180 to 220 degrees Celsius, c) removing water from the prepolymer and/or precondensate in a one- to five-stage coiled tube in which a slow and controlled reduction of pressure takes place. The coiled tube was designed so that both relatively highly viscous prepolymer and relatively highly pressurized low-viscosity precondensate can be conveyed or discharged by pressure into the pressure reactor downstream, d) treating the intermediate product in a second pressure reactor with driving-off of water, where the lactam driven off during the preparation of copolyamide of the nylon-6/nylon-6,6 type is directly reintroduced into the pressure stage in a rectification column, e) further removal of water from the polymeric melt as described under c) and feeding the polymeric melt to a first postcondensation reactor, f) a first postcondensation in a vertical reactor at temperatures in the range from about 210 to 285° C., where the process is conducted from top to bottom by forming thin films of melt and driving off the water no longer needed for the remainder of the polymerization process, g) further postcondensation of the melt in downstream reactors if high viscosities are to be achieved.

The invention will be described in more detail using working examples listed below and a drawing.

BRIEF DESCRIPTION OF THE DRAWINGS

The drawing shows a diagram of the arrangement according to the invention of the steps for the continuous preparation of polyamides.

EXAMPLES

Working Example 1

The process and apparatus described here convert adipic acid/hexamethylenediamine salt (AH salt) to nylon-6,6. To this end, 80% of AH salt is melted with 20% of water in the dissolving vessel 1. The heat for melting is introduced via the heat exchanger 3, through which the mix is conducted by means of the pump 2. The introduction of water and AH salt into the dissolving vessel 1 takes place discontinuously. In the holding vessel for water 4, water is heated to 100° C., and the amount of AH salt needed is charged to the AH salt holder 5. When the discharge valve is opened the preheated water passes into the dissolving vessel 1, and after the pressure has been balanced and the AH salt falls under gravity into the melting section of the dissolving vessel 1. The dissolving vessel 1 is always inertized. The dissolving vessel 1, the heat exchanger 3 and the holding vessel for water 4 are heated by a heat-transfer medium. The aqueous AH salt solution required for the polymerization process is taken from the production loop continuously by the pump head 62. The aqueous AH salt solution is preheated in the heat exchanger 7 before it enters the pressure reactor 8. A pressure of 26 bar (overpressure) becomes established in the pressure reactor 8, which is operated without removal of volatiles. The resultant low-viscosity polymer with a solution viscosity of 1.09, at a level regulated by the pressure prevailing in the pressure reactor 8 is conveyed via the control valve 9 and the melt-drying section 10 into a second pressure reactor 11.

In the melt-drying section 10, the prepolymer is heated to 280° C. and at the same time the excess of water present is evaporated. The pressure on this prepolymer is then released in the pressure reactor 11 to a pressure of 3 bar (overpressure), and the prepolymer is conducted past a devolatilizing area to improve water vapor removal. The excess of water is removed from the process under pressure control via the control valve 13 and the immersion vessel 14. The rectification column 12 is not operated in this process and is switched to pass. This pressure stage gives a polymer with a solution viscosity of 1.5. This polymer is level-controlled and conveyed via the control valve 15 and the melt-drying section 16 into a post condensation reactor 17, operating under atmospheric pressure. The melt-drying section 16 evaporates the water still present in excess, and this is driven off from the melt on the devolatilizing area in the post-condensation reactor 17.

To drive off this water, hot nitrogen which has been preheated in the heat exchanger 18 is conducted through the post condensation reactor 17. Nitrogen and water are removed from the process via the immersion vessel 20. The rectification column 19 is not operated in this process and, as on the pressure reactor 11, is switched to pass.

A nylon-6,6 melt having a solution viscosity of 2.6 is discharged by means of the discharge pump 21 from the post condensation reactor 17, which is a gear pump.

Instead of an 80% strength aqueous AH salt solution, it is also possible to use an aqueous AH salt solution at a commercially available concentration of 60%, in which case the above-mentioned solution process prior to the pump head 62 would be omitted. However, this gain is associated with considerably higher energy usage.

Working Example 2

The aim is to prepare a nylon-6,6 with a solution viscosity of 3.3. The aqueous AH salt solution used has about 60% strength and is held at a product temperature of 90° C. in the dissolving vessel 1. The pump head 62 is used to convey the AH salt solution directly from the dissolving vessel 1 via the heat exchanger 7, as already described in Working Example 1, into the pressure reactor 8. Since no $\epsilon$-caprolactam is being conveyed, the stroke is set at 0 for the pump head 6.1. After this, the technology and method of operation are the same as described in Working Example 1.

In order to raise the solution viscosity at the discharge from the post condensation reactor 17 from 2.6 to 3.3, it is necessary to add two further post condensation reactors of design similar to that of post condensation reactor 17.

Working Example 3

The aim is to prepare, according to the invention, a copolyamide from $\epsilon$-caprolactam and AH salt. A 60% strength aqueous AH salt solution is used, and this is held in dissolving vessel 1. The $\epsilon$-caprolactam is taken from a storage tank. A double-piston pump is used to convey both of the products. The $\epsilon$-caprolactam is metered in using the pump head 6.1 and the aqueous AH salt solution using the pump head 6.2. The two products are mixed with one another prior to entry into the heat exchanger 7. The feed is 70% of AH salt and 30% of $\epsilon$-caprolactam, and these are preheated in the heat exchanger 7.

After this the method of operation is similar to that of Example 1 except for the operation of the rectification columns 12 and 19. storage tank. A double-piston pump is used to convey both of the products. The $\epsilon$-caprolactam is metered in using the pump head 6.1 and the aqueous AH salt solution using the pump head 6.2. The two products are mixed with one another prior to entry into the heat exchanger 7. The feed is 70% of AH salt and 30% of $\epsilon$-caprolactam, and these are preheated in the heat exchanger 7.

However, in a preferred embodiment $\epsilon$-caprolactam concentrations of from 1 to 99% are also generally possible.

After this and the method of operation is similar to that of Example 1 except for the operation of the rectification columns 12 and 19.

In the rectification columns 12 and 19, the gas mixture is separated. $\epsilon$-Caprolactam runs back into the reactor. Water, and nitrogen where appropriate, leave the polymerization process.

The pressure which becomes established in the pressure reactor 8 is 24 bar (overpressure). The prepolymer obtained has a solution viscosity of 1.13. After the pressure reactor 11, the polymer has a solution viscosity of 1.6. After the post condensation reactor 17 it has a solution viscosity of 2.6. The melting point is 195° C.

In the rectification columns 12 and 19, the gas mixture is separated. $\epsilon$-Caprolactam runs back into the reactor. Water, and nitrogen where appropriate, leave the polymerization process.

The pressure which becomes established in the pressure reactor 8 is 24 bar (overpressure). The prepolymer obtained has a solution viscosity of 1.13. After the pressure reactor 11, the polymer has a solution viscosity of 1.6. After the post condensation reactor 17 it has a solution viscosity of 2.6. The melting point is 195° C.

What is claimed is:

1. A process for continuous preparation of polyamides or copolyamides, the monomeric starting material for which comprises adipic acid/hexamethylenediamine salt and water or of adipic acid/hexamethylenediamine salt, water and $\epsilon$-caprolactam, which comprises reacting said monomeric starting material under pressure at temperatures of from 180 to 280° C. in a closed system and then introducing the polyamide thus produced to a further pressure stage and to one or more post condensation stages, at the start of each of which the water has evaporated is removed or driven out by an inert gas.

2. A process as claimed in claim 1, wherein when a copolyamide is prepared with addition of $\epsilon$-caprolactam in a proportion of from 1 to 99%, the reacting step is run under pressure and without devolatilization.

3. A process as claimed in claim 1, wherein the starting materials for preparing polyamide comprises from 60 to 80% of adipic acid/hexamethylenediamine salt and from 20 to 40% water.

4. A process as claimed in claim 1, wherein the starting materials for preparing polyamide comprises 70% of adipic acid/hexamethylenediamine salt and 30% $\epsilon$-caprolactam.

5. A process as claimed in claim 2, wherein the starting materials for preparing polyamide comprises 70% of adipic acid/hexamethylenediamine salt and 30% $\epsilon$-caprolactam.

6. An apparatus for carrying out the process as claimed in claim 1 comprising a heat exchanger disposed on the upstream side of a first pressure reactor and connected thereto, said first pressure reactor comprising an isolatable pressure reactor, a second pressure reactor disposed downstream of the first pressure reactor and connected thereto by a heated conduit, a post-condensation reactor disposed downstream of and connected to said second pressure reactor by a heated conduit, a pressure reducer disposed in the conduit between the first pressure reactor and the second pressure reactor and a melt dryer disposed in the connection between the first pressure reactor and the second pressure reactor.

\* \* \* \* \*